3,496,208
N-TRICHLOROMETHYLTHIOCARBANILIDES
Gerald L. Bachman and Joseph W. Baker, Kirkwood, Mo., assignors to Monsanto Company, St. Louis, Mo., a corporation of Delaware
No Drawing. Filed Oct. 6, 1967, Ser. No. 673,288
Int. Cl. C07c 127/18, 161/00
U.S. Cl. 260—453                                    9 Claims

ABSTRACT OF THE DISCLOSURE

This disclosure covers N-trichloromethylthiocarbanilides having the general formula

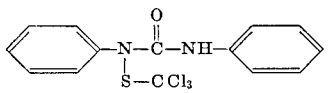

wherein each of the phenyl rings can contain up to three chlorine or bromine substituents. These compounds have been found to be useful in the control of bacteria.

---

This invention relates to a class of organic chemical compounds. More particularly, this invention is concerned with novel halogenated and unhalogenated carbanilides wherein a trichloromethylthio group is present as a substituent on one of the nitrogen atoms. Such materials have been found to possess useful and unexpected biological activity. The compounds of this invention have the formula

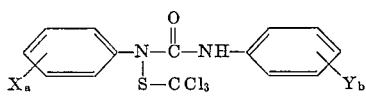

wherein X and Y are each selected from chlorine and bromine, and $a$ and $b$ are each integers from zero to three.

The carbanilides of this invention can be readily prepared by reacting a halogenated or unhalogenated carbanilide with trichloromethylsulfenyl chloride. In carrying out such a reaction, it is preferred to first add an alkali metal such as sodium to the carbanilide. The sodium serves to replace a hydrogen atom on one of the nitrogen atoms, thereby forming a sodium salt. The trichloromethylsulfenyl chloride is then added to yield the desired product. A typical reaction is illustrated by the following equation:

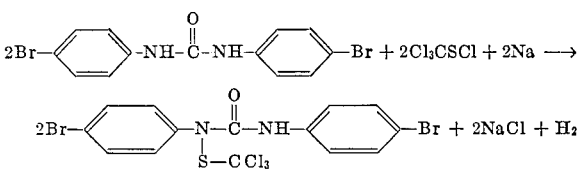

It is preferred to carry out the reaction in the presence of an inert organic solvent. Suitable solvents include benzene, toluene, xylene, the chlorinated benzenes, ethyl ether, propyl ether, tetrahydrofuran, and the like. The reaction temperatures employed in the preparation of the compounds of this invention will vary from room temperature to the reflux temperature of the reaction mixture. The specific temperature employed in any given preparation will be primarily dependent upon the particular reactants used therein.

The invention will be more fully understood by reference to the following examples which are set forth herein for the purpose of illustration only and which are not to be construed as limiting the scope of this invention in any manner.

EXAMPLE 1

A suitable reaction vessel is charged with 5.0 grams (0.0143 mole) of 3,3',4,4'-tetrachlorocarbanilide, 330 milligrams (0.0143 mole) of sodium and 100 ml. of xylene. The mixture is stirred and heated at reflux temperature for two hours. The resultant mixture is then cooled to 5° C. after which 2.7 grams (0.0143 mole) of trichloromethylsulfenyl chloride in 25 ml. of xylene is added dropwise. Upon completion of the addition, the mixture is heated at reflux temperature for one hour and then filtered while hot. The solvent is removed from the filtrate by evaporation at reduced pressure. The brown solid which remains is recrystallized from toluene to yield 1.0 gram of N-trichloromethylthio-3,3',4,4'-tetrachlorocarbanilide as a pink solid, M.P. 203–204° C. Analysis shows 49.6% chlorine as against a calculated value of 49.6% for $C_{14}H_7Cl_7N_2OS$.

EXAMPLE 2

Following the detailed procedure set forth in Example 1, there is employed 4.5 grams of 2',4,4'-trichlorocarbacarbanilide along with the amounts of sodium and trichloromethylsulfenyl chloride already specified. The product obtained is N-trichloromethylthio-3,3',4,5-tetrachlorocarbanilide.

EXAMPLE 3

Following the detailed procedure set forth in Example 1, there is employed 4.5 grams of 2',4,4'-trichlorocarbanilide along with the amounts of sodium and trichloromethylsulfenyl chloride already specified. The product obtained is N-trichloromethylthio-2',4,4'-trichlorocarbanilide.

EXAMPLE 4

Following the detailed procedure set forth in Example 1, there is employed 4.0 grams of 3,5-dichlorocarbanilide along with the amounts of sodium and trichloromethylsulfenyl chloride already specified. The product obtained is N-trichloromethylthio-3,5-dichlorocarbanilide.

EXAMPLE 5

Following the detailed procedure set forth in Example 1, there is employed 3.5 grams of 4'-chlorocarbanilide along with the amounts of sodium and trichloromethylsulfenyl chloride already specified. The product obtained is N-trichloromethylthio-4'-chlorocarbanilide.

EXAMPLE 6

Following the detailed procedure set forth in Example 1, there is employed 5.5 grams of 3,3',4',5,5'-pentachlorocarbanilide along with the amounts of sodium and trichloromethylsulfenyl chloride already specified. The product obtained is N-trichloromethylthio-3,3',4',5,5'-pentachlorocarbanilide.

EXAMPLE 7

Following the detailed procedure set forth in Example 1, there is employed 6.4 grams of 3,4,4'-tribromocarbanilide along with the amounts of sodium and trichloromethylsulfenyl chloride already specified. The product obtained is N - trichloromethylthio - 3,4,4'-tribromocarbanilide.

As stated above, the products of the present invention are useful as microbiocides adapted to be employed for the control of bacterial organisms. In a representative test, N-trichloromethylthio - 3,3',4,4'-tetrachlorocarbanilide is found to be effective against *Staphylococcus aureus* at a dilution in excess of one part per million. Further, when said compound is admixed with a well-known commercially available anionic detergent in a concentration of 0.5%, its effectiveness can also be demonstrated in a conventional home washing machine. Swatches of cloth inoculated with *Staphylococcus aureus* are found to be free of bacterial growth after laundering in a home washing machine using said admixed detergent. Similar activity is displayed by other and different carbanilides of this invention.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. A compound of the formula

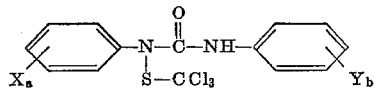

wherein X and Y are each selected from chlorine and bromine, and $a$ and $b$ are each integers from zero to three.

2. A compound as defined in claim 1 wherein X and Y are bromine.

3. A compound as defined in claim 1 wherein X and Y are chlorine.

4. A compound as defined in claim 3 wherein $a+b$ is equal to four.

5. A compound as defined in claim 3 wherein $a+b$ is equal to three.

6. A compound as defined in claim 3 wherein $a+b$ is equal to five.

7. A compound as defined in claim 1 wherein $a+b$ is equal to four.

8. A compound as defined in claim 1 wherein $a+b$ is equal to three.

9. N - trichloromethylthio - 3,3',4,4' - tetrachlorocarbanilide.

References Cited

UNITED STATES PATENTS

| | | | |
|---|---|---|---|
| 3,276,855 | 10/1966 | Richter | 260—453 X |
| 3,332,975 | 7/1967 | Bauer et al. | 260—453 |
| 3,349,125 | 10/1967 | Ratz et al. | 260—453 X |

FLOYD D. HIGEL, Primary Examiner

S. T. LAWRENCE III, Assistant Examiner

U.S. Cl. X.R.

252—106; 260—553; 424—298